United States Patent
Mayo

(10) Patent No.: US 10,280,338 B2
(45) Date of Patent: May 7, 2019

(54) PATCHES, SYSTEMS AND TAPES FOR PREVENTING OVERSANDING OF SURFACES

(71) Applicant: Bryant Mayo, St. Augustine, FL (US)

(72) Inventor: Bryant Mayo, St. Augustine, FL (US)

(*) Notice: Subject to any disclaimer, the term of this patent is extended or adjusted under 35 U.S.C. 154(b) by 0 days.

(21) Appl. No.: 15/430,632

(22) Filed: Feb. 13, 2017

(65) Prior Publication Data
US 2018/0230335 A1    Aug. 16, 2018

(51) Int. Cl.
| | |
|---|---|
| *C09J 11/04* | (2006.01) |
| *E04F 21/00* | (2006.01) |
| *C09J 11/06* | (2006.01) |
| *C09J 7/02* | (2006.01) |
| *C09J 7/21* | (2018.01) |
| *E04F 13/04* | (2006.01) |

(52) U.S. Cl.
CPC ............. *C09J 7/0207* (2013.01); *C09J 7/21* (2018.01); *E04F 13/042* (2013.01); *C09J 2201/122* (2013.01); *C09J 2201/606* (2013.01); *C09J 2203/31* (2013.01); *C09J 2400/263* (2013.01); *Y10T 428/14* (2015.01); *Y10T 428/28* (2015.01)

(58) Field of Classification Search
CPC ....... E04F 13/04; E04F 13/042; E04F 13/045; E04F 13/047; E04G 23/02; E04G 23/0203; C09J 7/21; C09J 7/0207; C09J 2201/122; C09J 2201/606; C09J 2203/31; C09J 2400/263; Y10T 428/14; Y10T 428/28

See application file for complete search history.

(56) References Cited

U.S. PATENT DOCUMENTS

| | | | | |
|---|---|---|---|---|
| 4,135,017 A * | 1/1979 | Hoffmann, Sr. | ........ | B29C 73/00 156/94 |
| 5,246,775 A * | 9/1993 | Loscuito | .................. | E04F 13/04 428/343 |
| 5,620,768 A * | 4/1997 | Hoffmann, Sr. | ........ | B29C 73/10 428/77 |
| 5,711,124 A * | 1/1998 | Stough | .................... | B32B 29/02 428/343 |
| 6,607,621 B1 * | 8/2003 | Swanson | ............. | E04G 23/0203 156/71 |
| 6,746,741 B2 * | 6/2004 | Wheatley | ................ | B29C 73/10 428/40.1 |
| 7,141,284 B2 * | 11/2006 | Newton | .................. | E04F 13/04 428/40.1 |
| 7,208,225 B2 * | 4/2007 | Zuber | ..................... | B32B 13/08 428/328 |
| 7,482,291 B2 * | 1/2009 | Newton | .................. | E04F 13/04 442/343 |
| 8,021,505 B2 * | 9/2011 | Lewis | ................. | E04G 23/0203 156/71 |

(Continued)

*Primary Examiner* — Patricia L. Nordmeyer

(57) ABSTRACT

A drywall tape including a fiber matrix having a first side and an opposing second side; a sandable coating on at least a portion of the first side of the fiber matrix, wherein the sandable coating is a first color; and, an adhesive element on at least a portion of the second side of the fiber matrix. Additionally, a system for preventing oversanding of surfaces including a matrix having a first side and an opposing second side; and, at least one sandable coating on at least a portion of the first side of the flexible matrix, wherein the sandable coating is a different color than the color of joint compound when dried.

16 Claims, 15 Drawing Sheets

(56) References Cited

U.S. PATENT DOCUMENTS

| | | | | |
|---|---|---|---|---|
| 2004/0023002 A1* | 2/2004 | Wyndham | ............ | E04F 13/042 |
| | | | | 428/156 |
| 2007/0245683 A1* | 10/2007 | Barry | ................. | E04G 23/0207 |
| | | | | 52/746.1 |
| 2008/0128070 A1* | 6/2008 | Goldman | ............. | E04F 13/042 |
| | | | | 156/71 |
| 2009/0229196 A1* | 9/2009 | Tubervile | ................ | E04F 13/04 |
| | | | | 52/105 |
| 2012/0047823 A1* | 3/2012 | Ojeda | ................ | E04G 23/0207 |
| | | | | 52/173.1 |

* cited by examiner

PATCHES, SYSTEMS AND TAPES FOR PREVENTING OVERSANDING OF SURFACES

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the field of tapes and patches, and more specifically to the field of preventing oversanding of surfaces.

BACKGROUND

Drywall is a type of board made from plaster, wood pulp, or other material, used especially to form the interior walls of houses. Joint compound (also known as drywall compound or mud) is a white powder of primarily gypsum dust mixed with water to form a mud the consistency of cake frosting. The terms "drywall compound", "joint compound" and "compound" will be used interchangeably throughout this application. Joint compound is used with paper or fiber joint tape to seal joints between sheets of drywall to create a seamless base for paint on interior walls.

In operation, when joint compound is used to seal joints between sheets of drywall, the compound must be sanded to create a smooth texture before painting. If the area joined by the joint compound is not sanded, then such area will appear rough, unfinished and look unprofessional. Therefore, the area joined by fiber joint tape and joint compound is sanded before painting.

WO 2007035338 discloses a roll of fiberglass mesh drywall tape that is sandable. However, a major problem with drywall tape taught in WO 200735338 is that it is difficult to know how much sanding is required and when to stop sanding because in many cases the color of the compound applied onto the sandable portion is the same color of the sandable coating after the compound is dry. Because the sandable coating is the same color of the compound, operators cannot differentiate between the sandable coating of the compound versus the sandable portion of the tape. In operation, if too much compound is sanded off the tape disclosed in WO 200735338, then the fibers of the fiberglass tape will be exposed. If the fibers are exposed those fibers would appear after painting of the wall, which is unsightly, and therefore would require a person to re-compound, re-sand and re-paint a wall.

Having to re-tape, re-compound, re-tape and re-paint is very time consuming, and inefficient. Re-compounding alone would take several hours because a person after applying compound for a second time would have to wait several hours for the compound to dry before re-sanding the compound. This is not only time consuming, but it also increases labor costs and material costs.

As a result, there exists a need for improvements over the prior art and more particularly for a more efficient way of preventing oversanding of surfaces.

SUMMARY

Patches, systems and tapes for preventing oversanding of surfaces is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a drywall tape is disclosed. A drywall tape including a fiber matrix having a first side and an opposing second side; a sandable coating on at least a portion of the first side of the fiber matrix, wherein the sandable coating is a first color; and, an adhesive element on at least a portion of the second side of the fiber matrix.

In another embodiment, a drywall repair patch is disclosed. The drywall patch includes a fiber matrix having a first side and an opposing second side; a sandable coating on at least a portion of the first side of the fiber matrix, wherein the sandable coating comprises a first layer having a first color d a second layer having a second color; and an adhesive element on at least a portion of the second side of the fiber matrix.

In another embodiment, a system for preventing oversanding of surfaces including a matrix having a first side and an opposing second side; and, at least one sandable coating on at least a portion of the first side of the flexible matrix, wherein the sandable coating is a different color than the color of the matrix.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
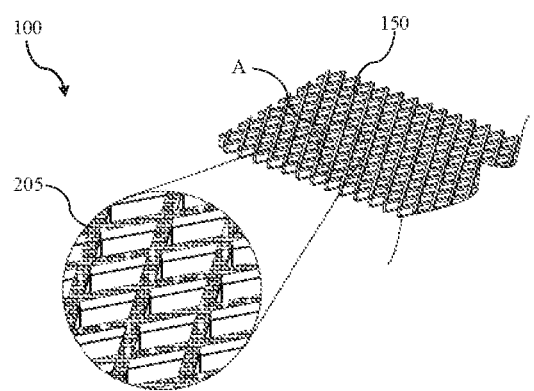
FIG. 1 is a top perspective view of a portion of a system for preventing oversanding of surfaces, according to a non-limiting example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system for easily determining when a person should stop sanding joint compound. The system prevents oversanding of surfaces by providing a matrix having a sandable coating that has a color that is noticeably different or different than the color of joint compound when dried so that it is not difficult to determine when to stop sanding. The system also prevents over sanding by providing a second layer of the sandable coating having a color that is noticeably different or different than the color of the first layer of the sandable coating and the color of joint compound when dried. Additionally, a first layer of the sandable coating may also have a different color or noticeably different color than the color of the matrix. The system allows the user to prevent fibers of joint tape from protruding from the surface of a wall when joint compound covering joint tape is oversanded.

Figure 1A:
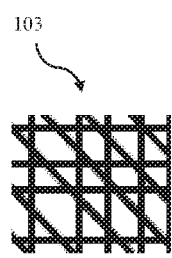
FIG. 1A is a top perspective view of a triaxial orientation pattern of a fiber matrix of the system, according to a non-limiting example embodiment.

Referring now to the Figures, FIG. 1 is a top perspective view of a portion of a system 100 for preventing oversanding of surfaces, according to a non-limiting example embodiment. In the present embodiment, the system comprises a body or matrix having matrix elements 105 arranged in a bilateral configuration. However, it is understood that other configurations such as a trilateral orientation, a quadrilateral orientation, or any combination of the above-mentioned orientations may also be included. The type of configuration may vary depending on the application for which the matrix will be used. Additionally, a flexible sheet or planar shaped body may be used. For example, FIG. 1A is a top perspective view of a basic representation of a triaxial orientated pattern 103 of a fiber matrix of the system, according to a non-limiting example embodiment. Additionally, other patterns may also be used and are within the spirit and scope of the present invention. Also worth noting is while FIG. 1A illustrates spaces between the fiber elements, it is understood that in other nonlimiting embodiments, fiber elements may be tightly woven to form a cloth. Additionally, as explained above, a planar body having flexible properties may also be used and are within the spirit and scope of the present invention. Additionally, other configurations are also within the spirit and scope of the present invention.

Figure 1B:
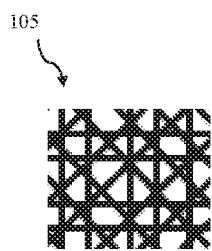
FIG. 1B is a top perspective view of a quadriaxial orientation pattern of a fiber matrix of the system, according to a non-limiting example embodiment.

By way of another example, FIG. 1B is a top perspective view of a triaxial orientated pattern 105 of a fiber matrix of the system, according to a non-limiting example embodiment. Additionally, other patterns may also be used and are within the spirit and scope of the present invention. Also, worth noting is while FIG. 1B illustrates spaces, it is understood that in other nonlimiting embodiments, fiber elements may be tightly woven to form a cloth or single planar surface. Additionally, as explained above, a planar body having flexible properties may also be used and are within the spirit and scope of the present invention. Additionally, other configurations are also within the spirit and scope of the present invention.

Figure 11:
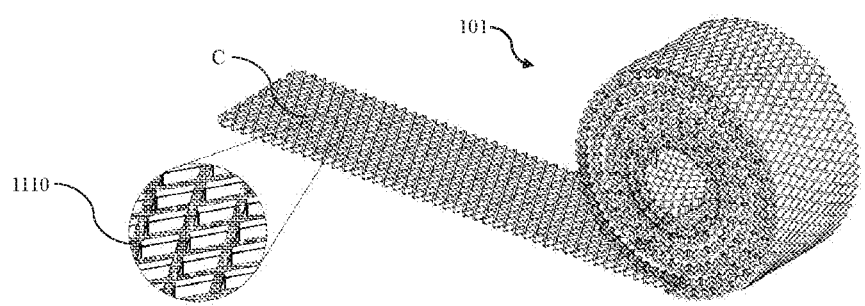
FIG. 11 is a perspective view of the system in tape form and in a rolled-up configuration, according to a non-limiting example embodiment; and, FIG. 12 is a perspective view of the system in patch form, according to a non-limiting example embodiment.

The matrix or body can be used in a variety of different applications. For example, the matrix may be used as a tape to join two sections of drywall or other types of construction materials. Additionally, the matrix may be used in patch form to cover an opening or hole in the surface of a piece of drywall or surface. The matrix may be rolled up in a fashion as illustrated in FIG. 11 or it may be a package in separate pieces for distribution. FIG. 1 also includes a magnified portion of matrix that is within the area enclosed by Circle A. The magnified portion of the matrix illustrates the sandable coating 205 that is further explained below.

Figure 2:
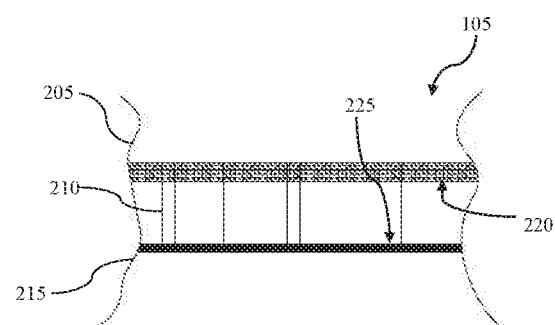
FIG. 2 is a side cross-sectional view of a portion of the system for preventing oversanding of surfaces, according to a non-limiting example embodiment.

FIG. 2 is a side cross-sectional view of a portion of the system 100 for preventing oversanding of surfaces, according to a non-limiting example embodiment. FIG. 2 is a cross-sectional side view a portion of the matrix elements 105 of the matrix illustrated in FIG. 1. Each of the matrix elements 105 of the matrix may comprise a fiber element 210 as illustrated in FIG. 2. Each fiber element may comprise material such as a glass fiber, a carbon fiber, a basalt fiber, an aramid fiber, a polyolefin fiber, a synthetic polymer fiber, a plant-product-based fiber, an animal-product-based fiber, or any combinations thereof. However, it is understood that other materials may also be used to form the fiber elements and are within the spirit and scope of the present invention. While the present embodiment does illustrate spaces between each of the fiber elements, it is understood that the fiber elements may also be tightly woven such that no spaces are generally visible and the fiber matrix forms a cloth.

The fiber elements 210 are joined together to form the fiber matrix, which may be in a bilateral orientation, a trilateral orientation, a quadrilateral orientation or any combination thereof. Each of the fiber elements, and as a result the fiber matrix, has a first side 220 and an opposing second side 225. A sandable coating 205 is disposed on at least a portion of the first side of each fiber element, and as a result the entire fiber matrix.

The sandable coating 205 on the first side of each fiber element and fiber matrix has properties such that it be removed using sandpaper. The sandable coating may comprise components including water, limestone, expanded perlite, ethylene-vinyl acetate polymer, attapulgite, talc, calcite, mica, gypsum and other ingredients. However other components may also be used and are within the spirit and scope of the present invention. The sandable coating 205 also includes a color that is different or noticeably different from the color of joint compound when the compound is dry. In many cases, the typical compound color is white. In the present embodiment, a variety of colors for the sandable coating 205 may be used. For example, the sandable coating may comprise dyes such that the sandable coating is the color red, blue, green, orange, yellow, purple, etc. A variety of dyes or elements may be used to adjust the color and/or shade of the sandable coating such as Acid, Azoic, Basic, Direct, Disperse, Mordant, Reactive, Solvent, Sulphur, Vat, Fluorescent, Leather, Leuco, Inkjet, Oxidation, Optical, Smoke, Solvent, Sublimation, natural, and synthetic dyes. It should be understood that a plurality of colors may be used. It is also understood that the color of the sandable coating should be somewhat of a lighter shade such that it is not viewable through the paint or primer when paint or primer is applied over the sanded sandable coating. Essentially, the color of the sandable coating should be such that it does not affect the color of the primer and is not visible after the primer or paint is applied on top of the sandable coating.

The fiber matrix also includes an adhesive element 215 on the second side of each of the fibers or fiber matrix. In one embodiment, the adhesive elements is a pressure sensitive adhesive. The adhesive may be a pressure sensitive adhesive comprising materials such as comprise lanolin, mineral oil, petroleum, rosin, silicone, and zinc oxide. The adhesive comprises properties such that the second side of the fiber matrix may be coupled to a surface. In one embodiment, the adhesive element may be a spray-on adhesive. In other embodiments, the adhesive element may be a layer. In other embodiments, the adhesive element may be separate bodies of adhesive. In one embodiment, the adhesive element may be applied to the second side of the fibers and/or fiber matrix by the operator before application. In other embodiments, the adhesive element may be applied during the manufacturing process and before the system is packaged for transport.

Figure 3:
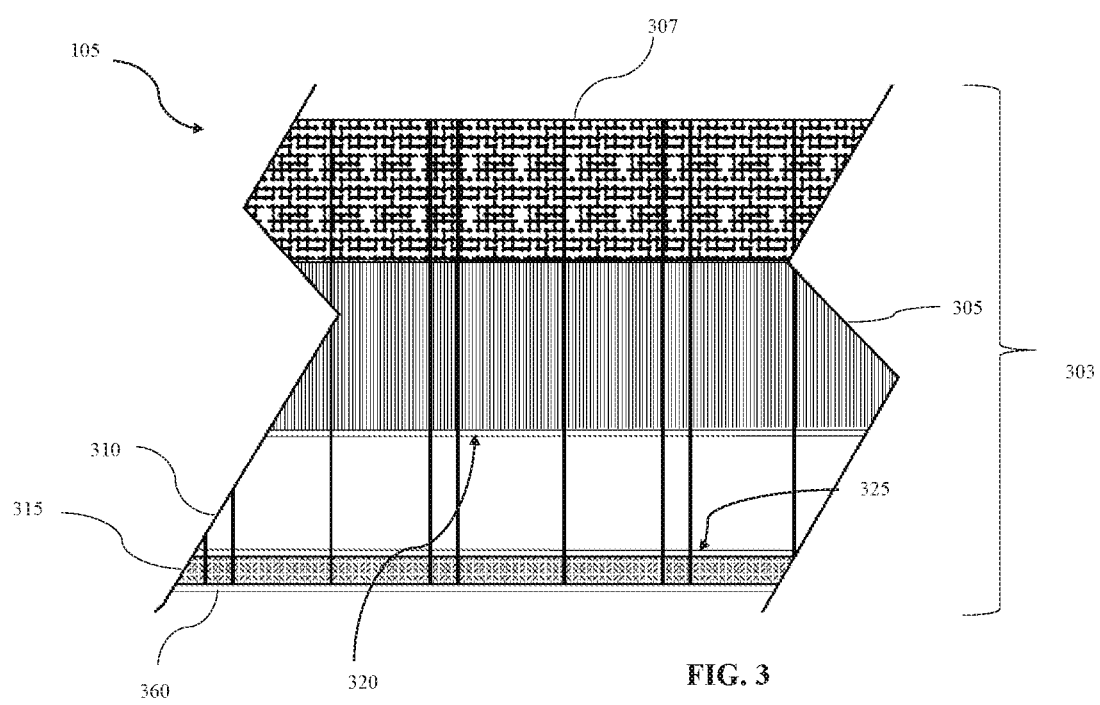
FIG. 3 is a side cross-sectional view of a portion of the system for preventing oversanding of surfaces, according to a second non-limiting example embodiment.

FIG. 3 is a side cross-sectional view of a portion of the system for preventing oversanding of surfaces, according to a second non-limiting example embodiment. FIG. 3 illustrates a portion of a matrix element 105. Each of the matrix elements comprise a fiber element 310. Like other embodiments, each fiber element may comprise material such as a glass fiber, a carbon fiber, a basalt fiber, an aramid fiber, a polyolefin fiber, a synthetic polymer fiber, a plant-product-based fiber, an animal-product-based fiber, or any combinations thereof. However, it is understood that other materials may form the fiber elements and are within the spirit and scope of the present invention.

Like the other embodiments, each of the fiber elements 310 is joined together to form the fiber matrix, which may be in a bilateral orientation, a trilateral orientation, a quadrilateral orientation or any combination thereof. Each of the fiber elements, and thus the fiber matrix, has a first side 320 and an opposing second side 325. Additionally, a planar shaped body having flexible properties may also be used and is within the spirit and scope of the present invention. The matrix or body must have properties such that it can be applied to a substantially flat surface.

A sandable coating 303 is disposed on the first side of the fiber matrix 310. In the embodiment illustrated in FIG. 3, the sandable coating comprises a first layer 305 that is inwardly positioned below a second layer 307. Stated differently, the second layer is outwardly situated relative to the first layer. In certain embodiments, the first layer is completely inwardly positioned below the second layer. In other embodiments, the first layer is substantially inwardly positioned (or stated differently the second layer is substantially outwardly positioned above the first layer).

The sandable coating 303 (both the first and second layers) on the first side of each fiber elements and fiber matrix has properties such that it be removed using sandpaper. he sandable coating may comprise components including water, limestone, expanded perlite, ethylene-vinyl acetate polymer, attapulgite, talc, calcite, mica, gypsum and other ingredients. However other components may also be used and are within the spirit and scope of the present invention. The sandable coating 303 also includes a color that is different or noticeably different from the color of typical compound. In many cases, the typical compound color is white. In the present embodiment, a variety of colors for both the first and second layers of the sandable coating 303 may be used. For example, the first and second layers of the sandable coating may comprise dyes such that each of the layers of the sandable coating may be color red, blue, green, orange, yellow, purple, etc. A variety of dyes or elements may be used to adjust the color and/or shade of the sandable coating such as Acid, Azoic, Basic, Direct, Disperse, Mordant, Reactive, Solvent, Sulphur, Vat, Fluorescent, Leather, Leuco, Inkjet, Oxidation, Optical, Smoke, Solvent, Sublimation, natural, and synthetic dyes. It should be understood that a plurality of colors may be used. It is also understood that the color of the sandable coating should be somewhat of a lighter shade such that it does not when paint or primer is applied over the sanded sandable coating the color of the sandable coating does not affect the color of the primer and is not visible after the primer paint is applied on top of the sandable coating. The first layer may be a color that is different than the second layer. Additionally, the first layer and second layer may be a color or shade that is different than the color or shade of the fiber matrix 310. The color or shade of both the first and second layers should be different than the color or shade of joint compound when dried.

Similar to other embodiment, the fiber matrix also includes an adhesive element 315 on the second side of each of the fibers or fiber matrix. In one embodiment, the adhesive element is a pressure sensitive adhesive. The adhesive may be a pressure sensitive adhesive comprising materials such as comprise lanolin, mineral oil, petrolatum, rosin, silicone, and zinc oxide. The adhesive comprises properties such that the second side of the fiber atrix may be coupled to a surface. In one embodiment, the adhesive element may be a spray-on adhesive. In other embodiments, the adhesive element may be a layer. In other embodiments, the adhesive element may be separate bodies of adhesive. In one embodiment, the adhesive element may be applied to the second side of the fibers and/or fiber matrix by the operator before application.

In the present embodiment, a removable backing 360 is coupled to the adhesive element to protect the adhesive elements during transport. The backing may be made of material, such as wax paper or other materials used to protect adhesive materials.

Figure 4:
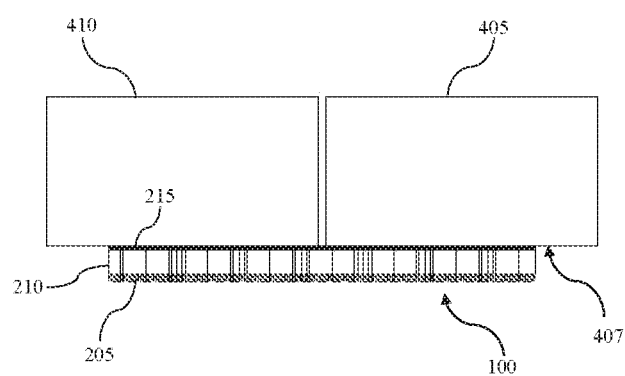
FIG. 4 is a top cross-sectional view of the system for preventing oversanding of surfaces adhered to drywall, according to a non-limiting example embodiment.

FIGS. 4-9B will be used to describe the application and use of the system. Referring to FIG. 4, in operation, an operator may remove the removable backing 360 (if applicable). In other embodiments, where a removable backing is not included, an operator may on unroll a portion of the system or drywall tape if it has been transported to a job site in a rolled-up configuration or fashion (as illustrated in FIG. 11). FIGS. 4-9B illustrate the system to be used as drywall joint tape.

Figure 5:
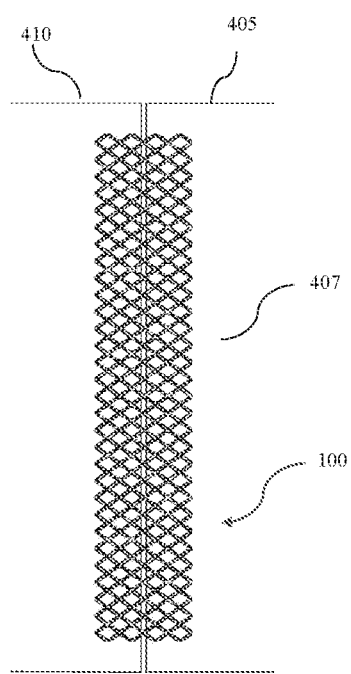
FIG. 5 is a front view of the system for preventing oversanding of surfaces adhered to drywall, according to a non-limiting example embodiment.

FIG. 4 is a top cross-sectional view of the system 100 for preventing oversanding of surfaces adhered to drywall, according to a non-limiting example embodiment and FIG. 5 is a front view of the system for preventing oversanding of surfaces adhered to drywall, according to a non-limiting example embodiment. In operation, an operator will couple the system or tape 100 so that it spans the gap between a first drywall portion 405 and a second drywall portion 410 so that it may join the first and second drywall portions. The adhesive element 215 will couple of the fiber matrix 210 to the drywall sections. As illustrated in FIGS. 4 and 5, the sandable coating 205 faces outward. After the system has been coupled to the surfaces, an operator will then move to the next step in the process as illustrated in FIGS. 6 and 7.

Figure 6:
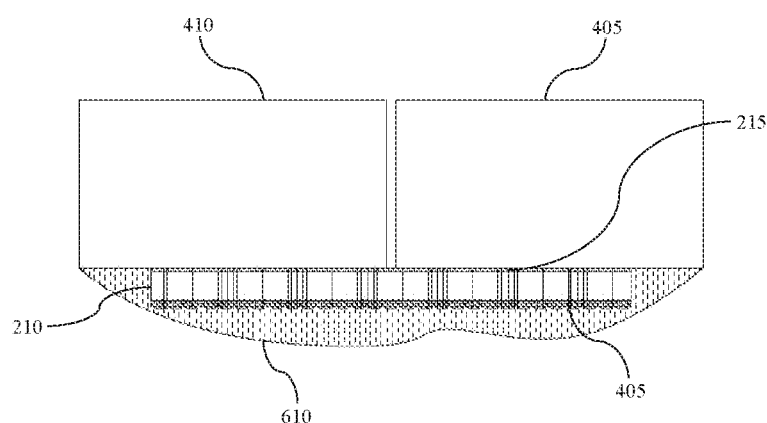
FIG. 6 is a top cross-sectional view of the system for preventing oversanding of surfaces adhered to drywall and having joint compound over the system, according to a non-limiting example embodiment.
Figure 7:
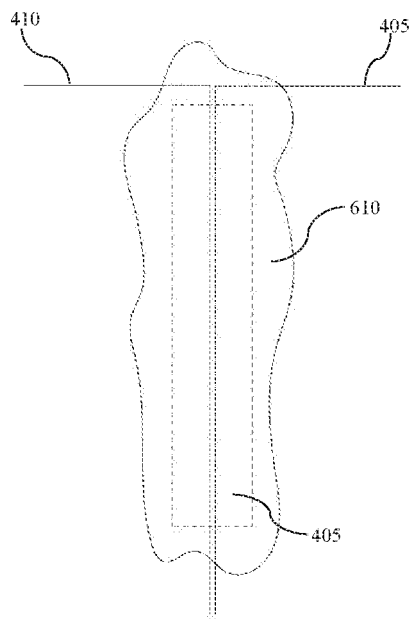
FIG. 7 is a front view of the system for preventing oversanding of surfaces adhered to drywall and having joint compound over the system, according to a non-limiting example embodiment.

FIG. 6 is a top cross-sectional view of the system for preventing oversanding of surfaces adhered to drywall and having compound 610 over the system according to a non-limiting example embodiment, and FIG. 7 is a front view of the system for preventing oversanding of surfaces adhered to drywall and having compound 610 over the system, according to a non-limiting example embodiment. As illustrated in FIGS. 6 and 7, an operator will then apply compound liberally over the drywall tape or system. After the compound, has sufficiently dried or hardened an operator will then move to the next step in the process as illustrated in FIGS. 8 and 9.

Figure 8:
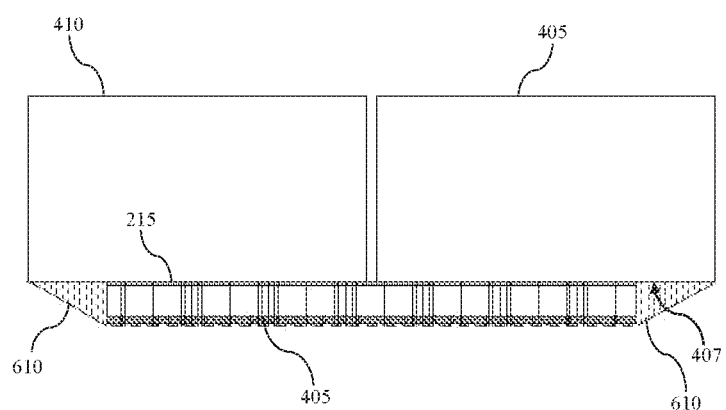
FIG. 8 is a top cross-sectional view of the system for preventing oversanding of surfaces adhered to drywall and having joint compound over the system, wherein the compound has been sanded exposing a sandable coating of the system, according to a non-limiting example embodiment.
Figure 9:
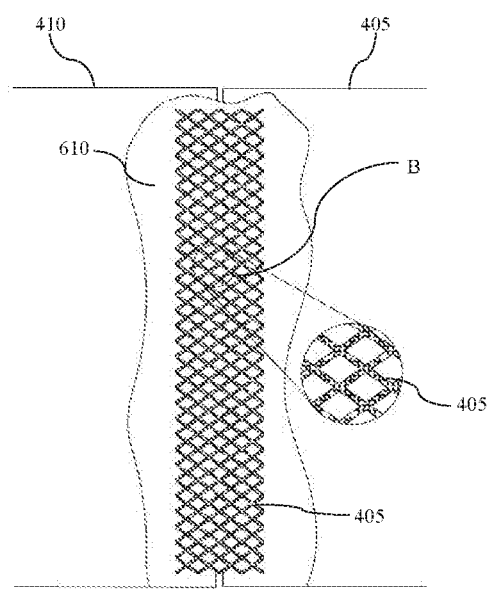
FIG. 9 is a front view of the system for preventing oversanding of surfaces adhered to drywall and having joint compound over the system, wherein the compound has been sanded exposing a sandable coating of the system, according to a non-limiting example embodiment.

FIG. 8 is a top cross-sectional view of the system for preventing oversanding of surfaces adhered to drywall and having compound 610 over the system, wherein the compound has been sanded exposing a sandable coating of the system, according to a non-limiting example embodiment, and FIG. 9 is a front view of the system for preventing oversanding of surfaces adhered to drywall and having compound over the system, wherein the compound has been sanded exposing a sandable coating of the system; according to a non-limiting example embodiment. FIGS. 8 and 9 illustrate the next step in the process. FIGS. 8 and 9 illustrate that after the compound has sufficiently hardened, an operator will then sand or remove the excess compound from the drywall surfaces 405, 410. Typically, the operator will sand the compound away so that it creates a smooth finished in preparation for priming and/or painting. As explained above, one of the major issues with the prior art is that it is very difficult to determine when to stop sanding. If an operator inadvertently sands too much, fibers will be exposed (as illustrated in FIG. 10 and further explained below) delaying the process of painting and causing unnecessary labor costs and inefficiencies.

One of the key features of the present invention is that the sandable coating 405 disposed on the first side of the fiber matrix or body comprises a first color that is different than the color of the hardened or dried joint compound. Additionally, the color of the sandable coating may also be different than the color of the fiber matrix 210. In operation, because the color of the sandable coating is different than the color of the color of the dried or hardened joint compound, as an operator sands, it becomes obvious to the user when to stop sanding because the color changes from the color of the compound to the color of the sandable coating. When the color of the sandable coating appears, an operator knows to stop sanding. Thus, over sanding of the joint compound tape is prevented. Thus, because over sanding is prevented, an operator can easily know when to stop sanding and also it assists less experienced operators from inadvertently, sanding more than required. FIG. 9 also includes a magnified portion of matrix that has been exposed after sanding that is within the area enclosed by Circle B. The magnified portion of the matrix illustrates the sandable coating 405 that is further explained below.

Figure 9B:
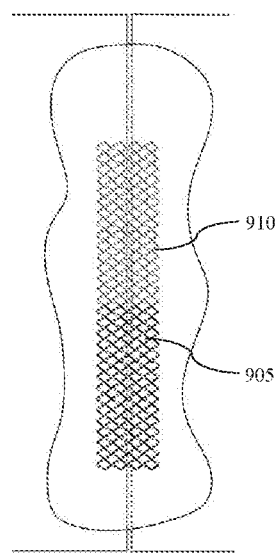
FIG. 9B is a front view of the system for preventing oversanding of surfaces adhered to drywall and having joint compound over the system, wherein the compound has been sanded exposing a first layer and a second layer of the sandable coating, according to a non-limiting example embodiment.

FIG. 9B is a front view of the system for preventing oversanding of surfaces adhered to drywall and having compound over the system, wherein the compound has been sanded exposing the second layer 910 and the first layer 905 of the sandable coating that is attached to the first side of the fiber matrix. Similarly, as mentioned above, the first and second layers may have colors or shades that are different from each other. Additionally, each the first and second layer may have colors or shades that are different than the color of joint compound when it is hardened or dried. Thus, a user may sand through the second layer completely before getting to the first layer. Having the second layer on top of the first layer provides an additional layer of protection for inadvertent excessive sanding. As a result, a user may use high-powered sanding machinery to sand excess compound while still being able to stop sanding before fiber elements are exposed and as a result over sanding is prevented.

Figure 10:
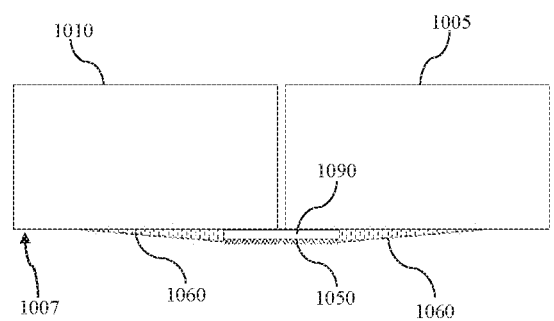
FIG. 10 is a top cross-sectional view of prior art illustrating fibers exposed after oversanding, according to a non-limiting example embodiment.

FIG. 10 is a top cross-sectional view of prior art illustrating fiber elements 1050 exposed after oversanding, according to a non-limiting example embodiments. As mentioned above, one of the main limitations that occurs with the prior art is over sanding. If over sanding occurs, the fiber elements 1050 will be exposed and protrude above the surface of the joint compound 1060. When the fiber elements are exposed, it creates hairs that will protrude above any paint or primer thereby creating an unsightly and unprofessional finish. When fibers are inadvertently exposed, an operator must reapply compound, wait for the compound to try and/or harden again, and then re-sand the compound hoping that the tape or fiber elements is not inadvertently exposed again. Thus, the prior art creates a potential for many costs, labor and time-based inefficiencies.

Figure 12:
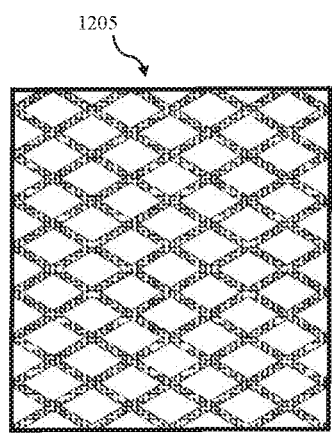

FIG. 11 is a perspective view of the system or tape in a rolled-up configuration 1105, according to a non-limiting example embodiment. A portion of the tape within circle C is magnified which revealing the sandable coating 1110. Also, worth noting is the that in FIG. 11 tape does not include an adhesive element on this tape. As mentioned above, an operator can apply adhesive to the tape on the opposing side of the tape directly before applying the tape to a surface. Additionally, as mentioned above, the system may also be included in a patch form, which is essentially a planar shaped body or matrix that is wider than the joint tape. In patch form, the system may be used to patch large holes as well as smaller holes. FIG. 12 is a perspective view of the system in patch form 1205, according to a non-limiting example embodiment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A fiber matrix comprising:
   the fiber matrix having a first side and an opposing second side;
   a sandable coating on only and configured to remain above the fiber matrix wherein the sandable coating comprises a first dye;
   wherein the sandable coating provides an indicator above the matrix for preventing sanding of the fibers; and,
   an adhesive element on at least a portion of the second side of the fiber matrix.

2. The fiber matrix of claim 1, wherein the fiber matrix comprises a second dye different than the first dye of the sandable coating.

3. The fiber matrix of claim 1, wherein the fiber matrix is arranged in a biaxial orientation, a triaxial orientation, a quadriaxial orientation or any combination thereof.

4. The fiber matrix of claim 1; wherein the fiber matrix comprises flexible properties.

5. The fiber matrix of claim 1, wherein the fiber matrix includes a glass fiber, a carbon fiber, a basalt fiber, an aramid fiber, a polyolefin fiber, a synthetic polymer fiber, a plant-product-based fiber, an animal-product-based fiber, or any combinations thereof.

6. The fiber matrix of claim 1; wherein the tape further includes a removable backing for covering the adhesive layer.

7. The fiber matrix of claim 1, wherein the adhesive element is a pressure sensitive adhesive.

8. The fiber matrix of claim 1, wherein the sandable coating comprises properties such that it may be removed using sandpaper.

9. A drywall repair patch for providing a smooth surface for painting, the repair patch comprising:
   the fiber matrix having a first side and an opposing second side;
   a sandable coating on only and configured to remain above the fiber matrix, wherein the sandable coating comprises a first layer having a first dye and a second layer having a second dye;
   wherein the sandable coating provides an indicator above the matrix when interacting with joint compound for preventing sanding of the fibers; and,
   an adhesive element on at least a portion of the second side of the fiber matrix.

10. The drywall repair patch of claim 9, wherein at least a substantial portion of the second layer is outwardly situated relative to the first layer.

11. The drywall repair patch of claim 9, wherein the fiber matrix is arranged in a biaxial orientation, a triaxial orientation, a quadriaxial orientation or any combination thereof.

12. The drywall repair patch of claim 9, wherein the fiber matrix comprises flexible properties.

13. The drywall repair patch of claim 9, wherein the fiber matrix includes a glass fiber, a carbon fiber, a basalt fiber, an aramid fiber, a polyolefin fiber, a synthetic polymer fiber, a plant-product-based fiber, an animal-product-based fiber, or any combinations thereof.

14. The drywall repair patch of claim 9, wherein the tape further includes a removable backing for covering the adhesive layer.

15. The drywall repair patch of claim 9, wherein the adhesive element is a pressure sensitive adhesive.

16. The drywall repair patch of claim 9, wherein the sandable coating comprises properties such that the first and second layers may be removed using sandpaper.

\* \* \* \* \*